United States Patent [19]

McKeefery et al.

[11] Patent Number: 5,175,480

[45] Date of Patent: Dec. 29, 1992

[54] VEHICLE GUIDANCE AND CONTROL SYSTEMS AND METHODS FOR CONTROLLABLY GUIDING A VEHICLE ALONG A PREDETERMINED PATHWAY

[76] Inventors: James McKeefery, 2070 Stratford Dr., Milpitas, Calif. 95035; James Sachs, 503 Gilbert Ave., Menlo Park, Calif. 94025; Richard Wotiz, 15010 Montebello Rd., Cupertino, Calif. 95014

[21] Appl. No.: 467,254

[22] Filed: Jan. 18, 1990

[51] Int. Cl.⁵ .............................................. G05D 1/00
[52] U.S. Cl. ................................. 318/587; 318/586; 180/168; 364/424.02
[58] Field of Search .................. 318/587; 364/424.01, 364/424.02; 340/825.05; 180/167, 168, 82 E, 169

[56] References Cited

U.S. PATENT DOCUMENTS

| | | | |
|---|---|---|---|
| 2,847,080 | 8/1958 | Zworykin et al. | 180/82 E |
| 3,147,817 | 9/1964 | Liban | 180/168 |
| 3,468,391 | 9/1969 | Rushing et al. | 180/168 |
| 3,556,244 | 1/1971 | Gray | 318/587 X |
| 3,606,933 | 9/1971 | Rushing et al. | 180/168 |
| 3,696,882 | 10/1972 | Martin | 180/168 |
| 4,162,869 | 7/1979 | Hitomi et al. | 180/168 X |
| 4,354,235 | 10/1982 | Blakeslee | 364/424.02 |
| 4,486,694 | 12/1984 | Ohba et al. | 318/587 |
| 4,520,889 | 6/1985 | Abe et al. | 180/168 |
| 4,524,314 | 6/1985 | Walker | 318/587 |
| 4,613,804 | 9/1986 | Swenson | 318/587 |
| 4,791,570 | 12/1988 | Sherman et al. | 180/168 X |
| 4,855,656 | 8/1989 | Saitoh et al. | 180/167 X |
| 4,864,207 | 9/1989 | Miura et al. | 318/587 |

Primary Examiner—Paul Ip
Attorney, Agent, or Firm—Blakely, Sokoloff, Taylor & Zafman

[57] ABSTRACT

In accordance with the method, first and second substantially parallel conductors are placed along a pathway and coupled to a controller in a manner so that each may carry a current independently controllable by the controller. A sensing coil is placed in a vehicle having a coil axis approximately perpendicular to the plane of the conductors so as to sense the varying magnetic field caused by varying currents through the two conductors. The controller repetitively provides a half-cycle of current of a given frequency in one of the two wires, immediately followed by another half-cycle of current of the opposite polarity or direction in the other of the two wires. The sensing coil on the vehicle senses the magnetic field caused by these varying currents in a manner dependent upon its proximity to each of the two wires, and controls the vehicle steering responsive thereto, sensing a substantially balanced wave when centered between the two wires, a positively distorted wave when closed to one of the wires and a negatively distorted wave when closer to the other of the two wires. Modulation of the frequency of the current in the two wires provides communication capability from the controller to the vehicle for remote steering and speed control. Apparatus for carrying out the method and alternative embodiments are disclosed.

21 Claims, 10 Drawing Sheets

VEHICLE GUIDANCE AND CONTROL SYSTEMS AND METHODS FOR CONTROLLABLY GUIDING A VEHICLE ALONG A PREDETERMINED PATHWAY

BACKGROUND OF THE INVENTION

1. Field of the Invention

The present invention relates to the field of vehicle navigation along a predetermined pathway.

2. Prior Art

In certain applications it is desirable to provide a driverless vehicle which will follow one or more predetermined paths by itself. One known approach for achieving this objective is to provide a conductor along the path the driverless vehicle is to follow and to sense on the vehicle the magnetic field caused by a varying current in the conductor to locate the vehicle at any time with respect thereto. Such a system is described in U.S. Pat. No. 3,039,554, with the second paragraph of the patent providing a good description of the basic concept of such systems. As generally stated therein, the route defining conductor may be secured on or laid just beneath the surface of the ground, floor, roadway, etc. Normally the electrical signal for steering the vehicle is an oscillating or AC current which produces a corresponding alternating magnetic field in the vicinity of the route defining conductor. Two sensing coils on a vehicle proceeding along the route defined by the conductor are so arranged that the magnetic field which exists in the vicinity of the conductor induces signals in the sensing coils, which signals are used to control the steering mechanism of the vehicle. The arrangement is such that when one of the signals derived from one of the coils is larger than that derived from the other, the steering mechanism operates to redirect the vehicle toward the route defining conductor. The resulting movement of the vehicle causes the positions of the sensing coils to change in relation to the conductor, and thus the steering mechanism is controlled in such a way as to tend to maintain equality between the voltages induced in the two sensing coils. Systems of this general kind, with variations and/or embellishments, are disclosed in U.S. Pat. Nos. 4,010,409, 4,310,789, 4,215,759, 4,656,406 and 4,736,812.

In the foregoing systems, the current in the route defining conductor is generally provided by some stationary power source, though included in the foregoing patents are means for switching for defining branches in the pathways. In U.S. Pat. No. 4,855,656, the current in the route defining conductor is not provided by a stationary source, but rather is induced therein from the vehicle itself. Thus in this patent, means are provided on the vehicle for inducing a current in the conductor, with a second means on the vehicle separated from the first (again using two sensing coils) sensing the magnetic field caused by the current induced in the conductor.

U.S. Pat. No. 4,284,941 discloses a system for data communications between fixed and moving terminals wherein a conductor connected to the fixed terminal and disposed in the travel path of the moving terminals supports lateral guidance control information for the moving terminals as well as two way inductive data communications between the fixed terminal and the moving terminals. The fixed terminal transmits over the conductor an alternating current lateral guidance signal modulated in accordance with longitudinal control information for each of the moving terminals. Each of the moving terminals, in turn, transmits status information over the conductor to be used for developing control information at the fixed terminal. The fixed terminal employs hybrid transformer techniques in conjunction with precision filtering to enable reception of low level status information from the moving terminals and concurrent rejection of the modulated lateral guidance signal and other interfering signals.

In the foregoing systems using a single path defining fixed conductor and a pair of sensing coils on the moving vehicle, one normally servos the steering to the output of the sensing coils to drive the difference in output of the two sensing coils to zero. In certain applications however, it may be desired to provide some form of additional steering control on the vehicle. By way of example, in U.S. Pat. No. 4,284,941 herein before referred to, a controller on the vehicle may be used to effect travel path selection. In other situations it may be desired to control the path of the vehicle relative to the conductor, at least within reasonable limits. By way of example, the preferred embodiment of the present invention is used in conjunction with a toy road raceway set wherein each of two players may control a respective one of two battery operated race cars on a flat (unslotted) race track. Thus, in the present invention it is desired to have each player be able to steer the respective race car down any part of the full width of the track, so that the racers can jockey for position in the turns, pass each other on the straightaways, etc. While some control over track position could be achieved in the prior art systems by servoing the difference in the sensor coil outputs to a controllable offset, the extent of control which may be achieved in this manner is limited, primarily because of constraints in the geometry of the system. In particular, so long as the axes of the two sensing coils on the vehicle stay clearly on opposite sides of the conductor, reasonable control can be obtained in this matter. However, this does not allow sufficient maneuvering for passing and for meaningful control of the vehicle going into and coming out of turns. For greater excursions however, gross nonlinearities and even instabilities may develop because of the declining signal in the outer sensing coil, and a polarity reversal in the inner sensing coil as its axis moves over the conductor so that the axis of both sensing coils are on the same side thereof. Thus, these single wire systems of the prior art have been found inappropriate for lateral control to the extent desired for applications such as, by way of example, a toy race car set.

BRIEF SUMMARY OF THE INVENTION

In accordance with the method, first and second substantially parallel conductors are placed along a pathway and coupled to a controller in a manner so that each may carry a current independently controllable by the controller. A sensing coil is placed in a vehicle having a coil axis approximately perpendicular to the plane of the conductors so as to sense the varying magnetic field caused by varying currents through the two conductors. The controller repetitively provides a half-cycle of current of a given frequency in one of the two wires, immediately followed by another half-cycle of current of the opposite polarity or direction in the other of the two wires. The sensing coil on the vehicle senses the magnetic field caused by these varying currents in a manner dependent upon its proximity to each of the two wires, and controls the vehicle steering responsive thereto, sensing a substantially balanced wave when centered between the two wires, a positively distorted wave when closer to one of the wires and a negatively distorted wave when closer to the other of the two wires. Modulation of the frequency of the current in the two wires provides communication capability from the controller to the vehicle for remote steering and speed control. Apparatus for carrying out the method and alternative embodiments are disclosed.

DETAILED DESCRIPTION OF THE INVENTION

Figure 1:
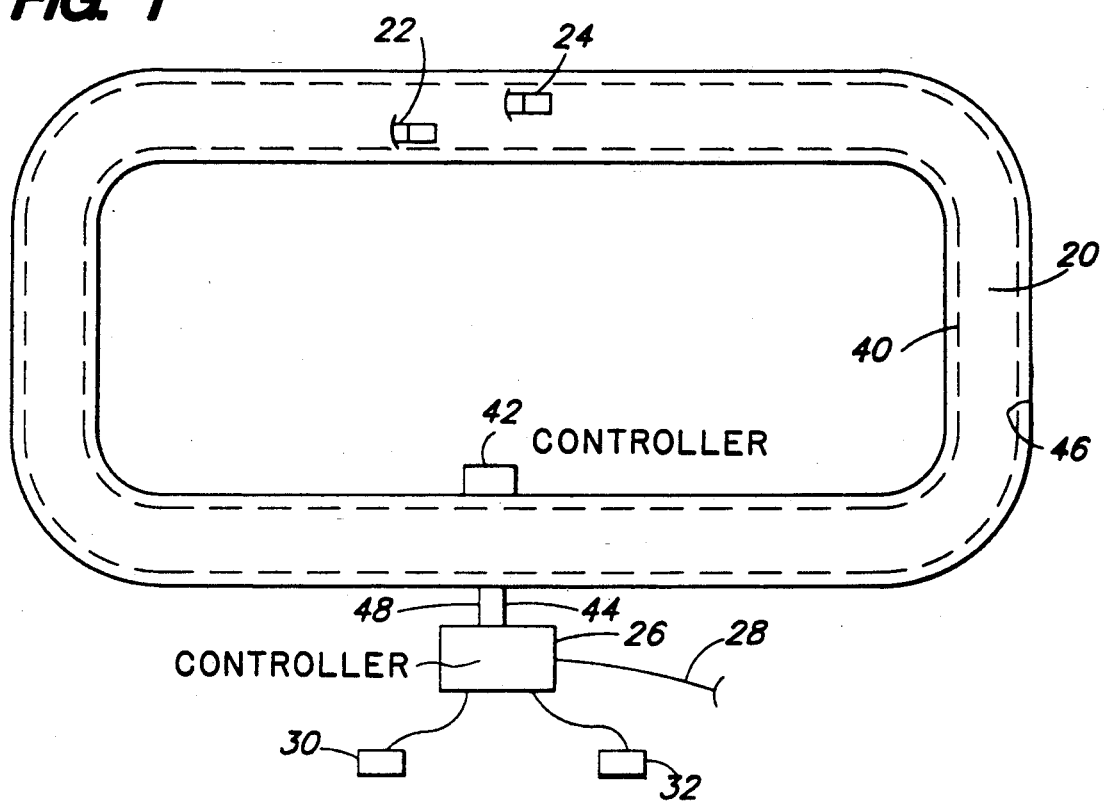
FIG. 1 is a schematic top view of a typical toy race car set setup in accordance with the present invention.

First referring to FIG. 1, a schematic diagram of the preferred embodiment of the present invention may be seen. As shown therein, a closed track or raceway 20 provides a substantially flat surface for a pair of battery operated vehicles 22 and 24 to race on. At one side of the track is a track controller unit 26 connected to a source of electrical power through line 28 which may be, by way of example, an appropriate voltage such as 9 volts provided by a small AC/DC converter of standard construction plugged into a 115 volt VAC outlet. Plugged into controller 26 are a pair of hand controllers 30 and 32 which, as shall subsequently be seen, each contain manually operable controls for providing a steering control and a "throttle" or speed control for a respective one of the race cars 22 and 24.

Figure 2:
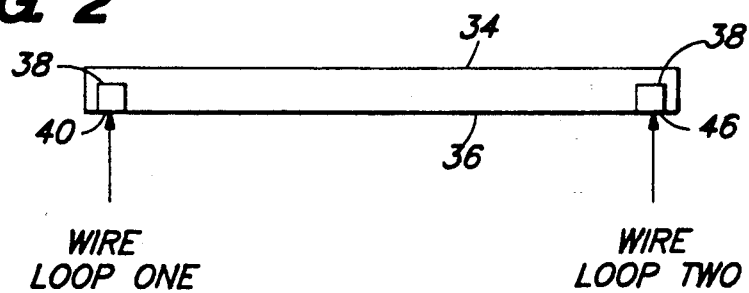
FIG. 2 is a typical cross section of the track 20 of the race car set of FIG. 1.

Referring now to FIG. 2, a schematic of the cross section of track 20 may be seen. The track is characterized by a substantially flat upper surface 34 and a lower surface 36 which may be ribbed, etc. for support of the upper surface. At each side of the track is a slot 38, with the full loop of track being made up of individual sections which may be coupled together, though which may be taken apart for storage, shipment, etc. When assembled as shown in FIG. 1, a first wire 40 is pressed or snapped into one of the grooves 38, the wire 40 thereby extending around the underside of the track adjacent the inner perimeter thereof to form a single loop with the ends thereof connected to a cross track controller 42 which in turn is connected to the main controller 26 through lines 44. Similarly, a second wire 46 is disposed in the other slot under the track adjacent the outer periphery thereof, this wire also forming a single loop and being connected to controller 26 through lines 48. The current in the loop of wire 46 is directly supplied from controller 26 through lines 48. However, in order to avoid creating large undesired fields across the roadway in the frequency range of interest, lines 44 from controller 26 to controller 42 provide relatively low signal level current signals for the current in coil 40, plus DC power, with controller 42 including an amplifier to amplify the current signal to provide the desired current level in loop 40.

Figure 3:
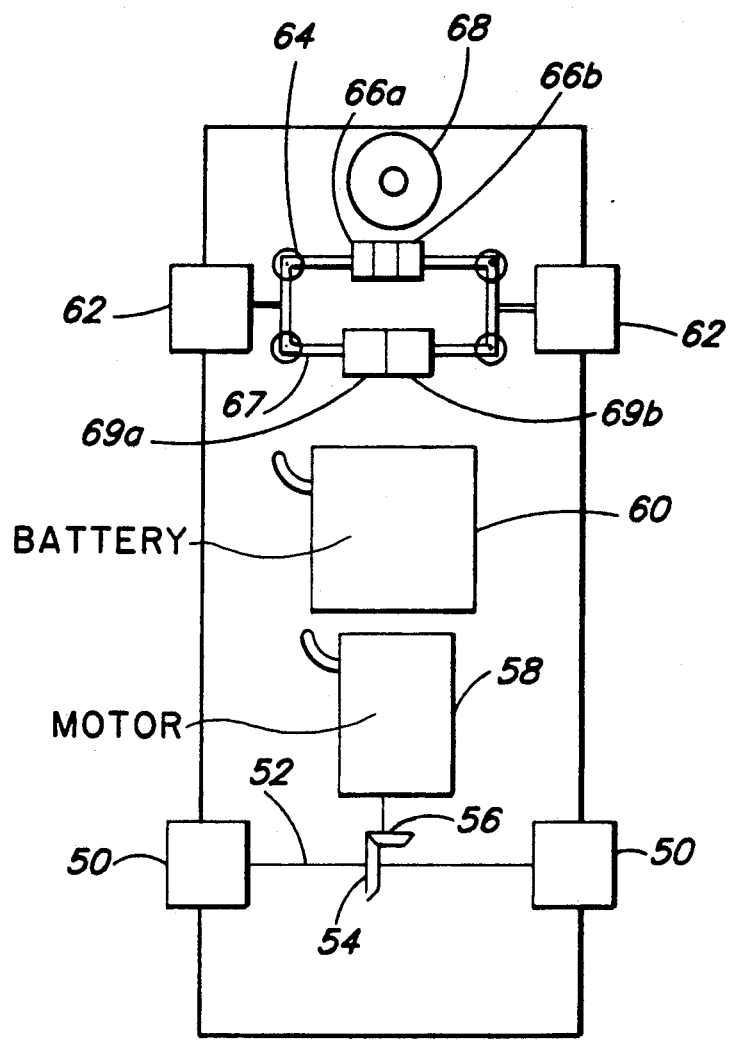
FIG. 3 is a top view of a typical toy race car illustrating the general arrangement of the drive, steering and sensing coil thereon.

A top view of a typical race car may be seen in FIG. 3. This Figure is schematic only, though it illustrates the general arrangement of the major elements of each car except for the electronics therein, normally packaged at a somewhat higher elevation within the car. Rear wheels 50 are fastened to rear axle 52 driven in rotation through gears 54 and 56 by electric motor 58 powered by a removable nicad battery 60 in the vehicle. The battery 60 and the motor 58 are not shown directly connected in this Figure, as interposed therebetween is a motor speed control responsive to a signal originating from one of the hand controllers 30 and 32 (see FIG. 1) and communicated to the vehicle in a manner to be subsequently described. The front wheels 62 of the vehicle are steerable through a steering link 64 having a magnetic member thereon responsive to steering control currents in steering coils 66a and 66b provided through the electronics in the car, yet to be described. Also, a second link 67 carries thereon a small ferrite slug, the position of which may be sensed by coils 69a and 69b fixed to the car chassis. Finally, toward the forward end of the car is a sensing coil 68 oriented with its axis substantially perpendicular to the plane of the wheels 50 and 62 and thus, perpendicular to the plane of the wires 40 and 46 in the race track.

Before providing details of the preferred in embodiment of the track controller 26 and of the electronics on each of the cars, it is perhaps best to first generally describe the operation of the system as background therefor. In operation the track controller 26 causes first a half cycle (half a full-cycle of a sine wave) of current to flow in one of the wires 40 and 46, and then the other half cycle, or half sine wave, in the other of wires 40 and 46, continuously alternating between the two wires in this manner. Since the second half sine wave is in effect the negative of the first, the current in the first half sine wave will flow in a predetermined direction around the loop, with the current in the second half sine wave in the other wire being of equal amplitude, but of opposite direction.

Figure 4:
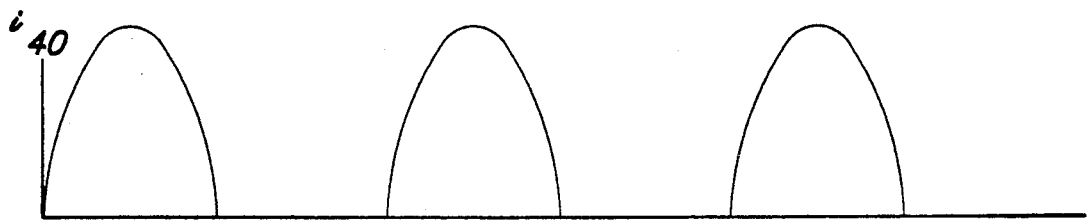
FIG. 4 illustrates a current wave form in the loop of wire around one side of the track.
Figure 5:
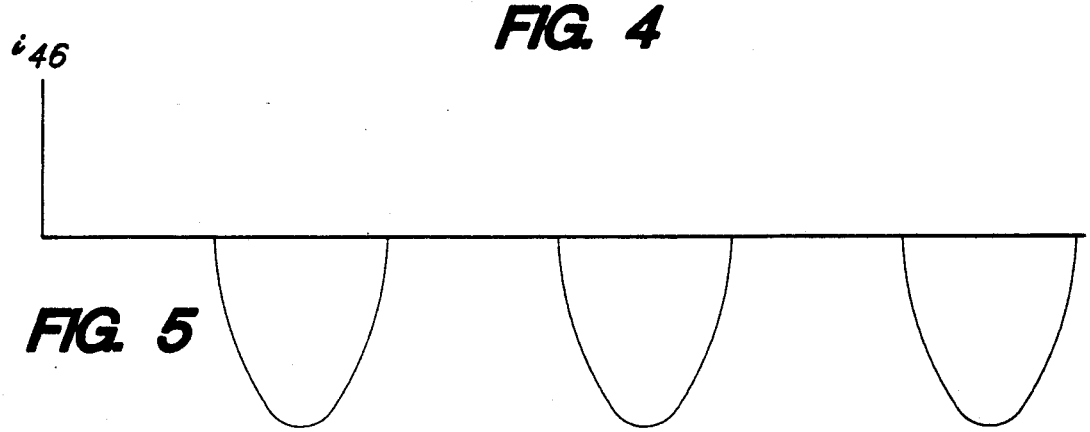
FIG. 5 illustrates the current wave form in the loop of wire around the other side of the track.
Figure 8:
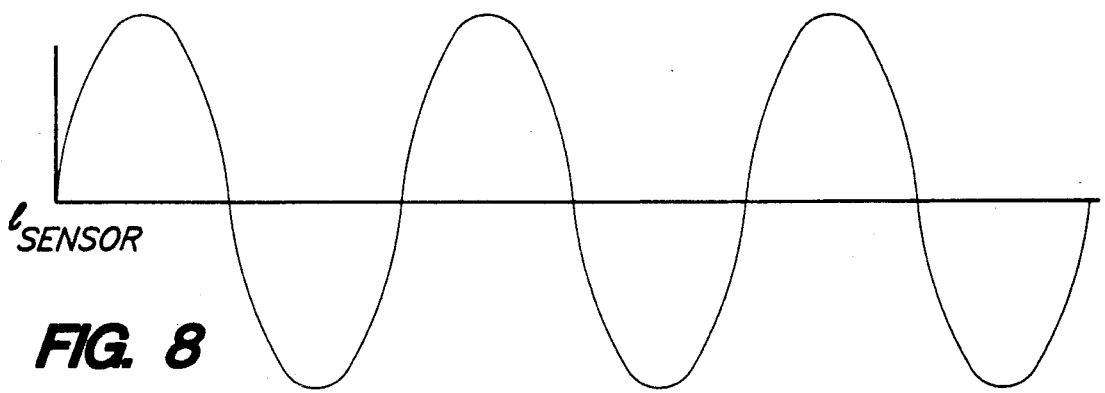
FIG. 8 illustrates the voltage wave form sensed by the sensing coil when the same is centered on the track.
Figure 11:
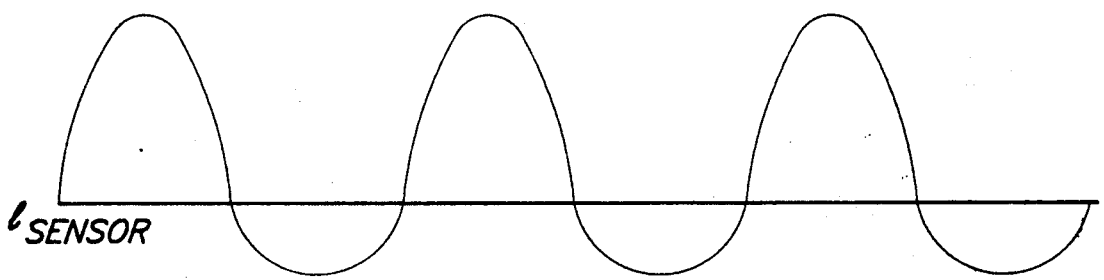
FIG. 11 illustrates the voltage wave form sensed by sensing coil on the car when the same is positioned at one side of the track.
Figure 6:
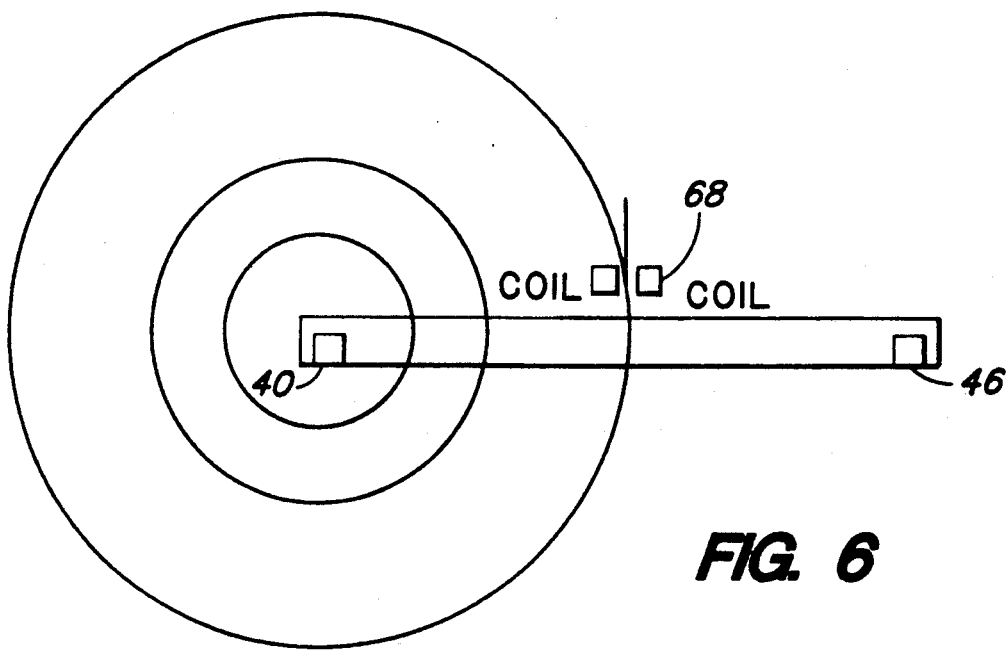
FIG. 6 illustrates the field sensed by the sensing coil 68 during the conduction of current in one of the wires around the side of the track with the car mid track.
Figure 7:
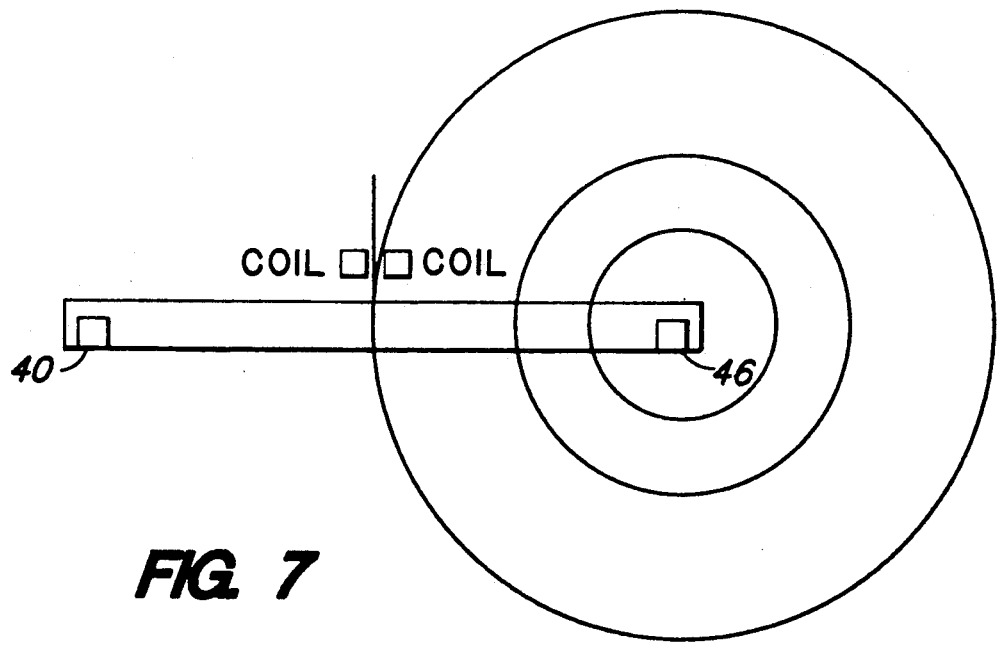
FIG. 7 illustrates the field sensed by the sensing coil through the current in the other wire around the other side of the track with the car mid track.
Figure 9:
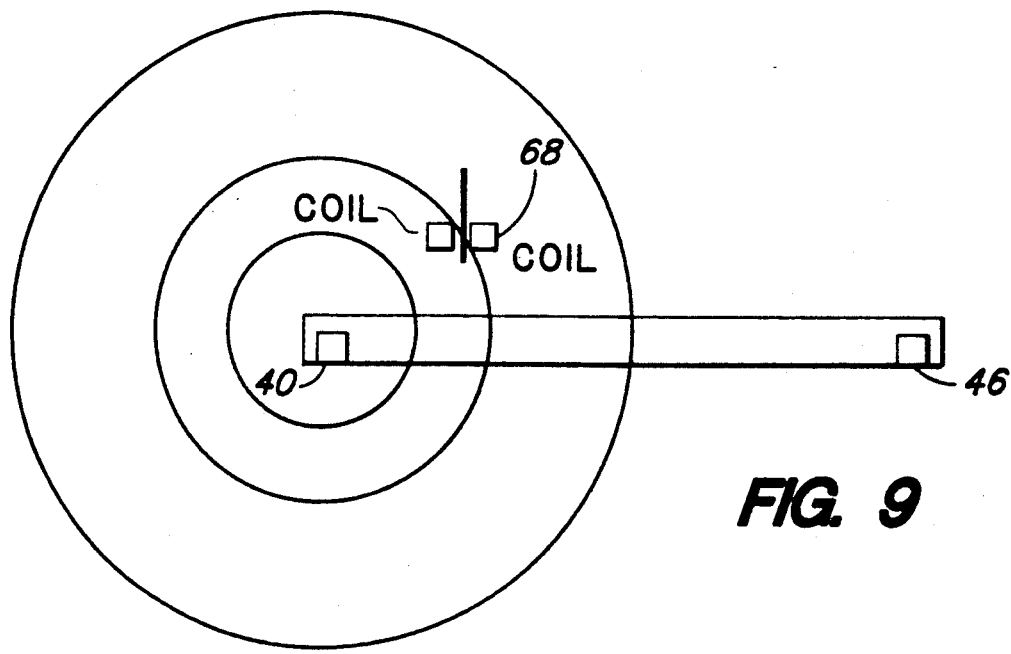
FIG. 9 illustrate the field sensed by the sensing coil 68 on the car due to the current in the wire around one side of the track when the car is positioned toward that side of the track.
Figure 10:
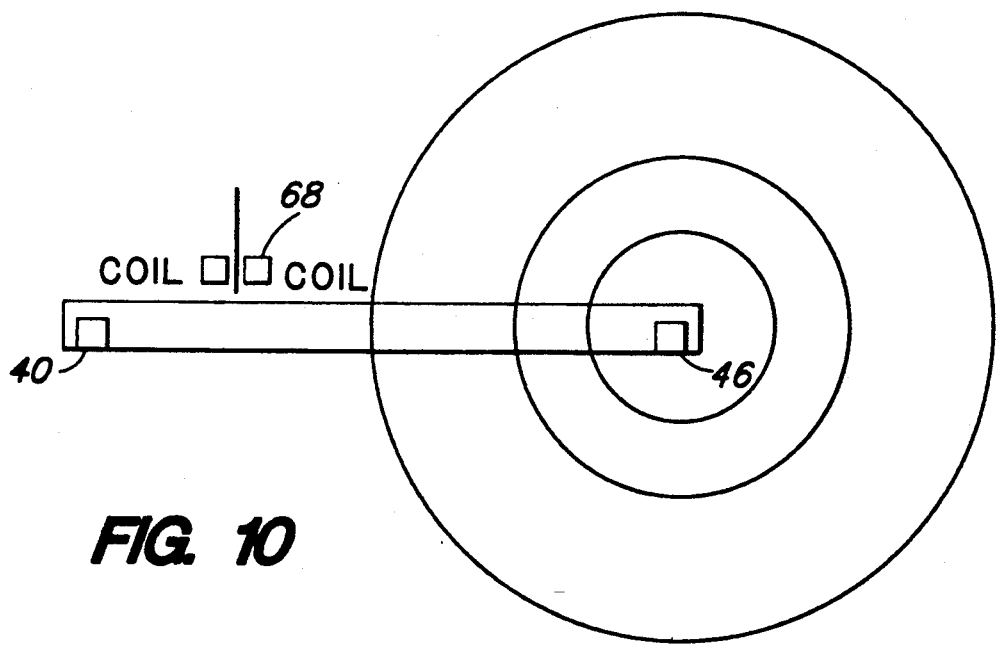
FIG. 10 is an illustration similar to FIG. 9 illustrating the substantially reduced field sensed by coil 68 caused by the current in the conductor at the other side of the track.

This is illustrated in FIGS. 4 and 5 wherein the current in loop 40 is shown as positive half sine waves with the current in loop 46 being the corresponding negative half sine waves, the current in one loop being off while the current in the other loop is on. The current in each loop causes a magnetic field around each wire varying in intensity with time in accordance with the sine wave form of the current, and of course having an intensity at any radius from the wire inversely proportional to that radius. Thus, it may be seen from the symmetry of FIGS. 6 and 7 that when the sensing coil 68 of one of the cars is positioned over the center of the track, the voltage induced in the coil during the two half cycles of current, one in one of the wires and the other in the other wire, will be a full sine wave as shown in FIG. 8. On the other hand, if the vehicle moves to one side of the track, such as the left side as shown in FIGS. 9 and 10, the current in loop 40 will induce a higher voltage in the sensing coil 68 than the current in loop 46 because of the coil 68 being closer to loop 40 and further away from loop 46. Thus the voltage induced in the sensing coil 68 on the vehicle will be unsymmetrical as generally shown in FIG. 11. Obviously, if the vehicle moves to the other side of the track so that sensing coil 68 is closer to loop 46 than loop 40, the sine wave of FIG. 8 will be distorted downward rather than upward as shown in FIG. 11.

The electronics on each race car includes a means for receiving steering and throttle information for controlling the car. The steering information is used in conjunction with a servo system which in essence servo controls the steering to drive the sense coil output to an offset which in effect, is the steering control signal. Thus, when the steering control signal is centered the steering servo system, which of course includes the coils 66a and 66b (FIG. 3) controlling the steering system as well as coils 69a and 69b for sensing and feeding back the steering system position, will control the steering so that the car will continue down the center of the track in the straightaways as well as in the turns. For a steering control signal toward one side, the servo system will steer the car toward one side of the track to essentially null out the steering control signal by an equivalent offset of the sensing coil output. Similarly, a steering control signal toward the opposite side will cause the car to move toward the other side of the track, the car continuing down the commanded track position in the turns as well as the straightaways until the steering control is changed.

In the previous description it was stated that the steering and throttle controls for each car are provided thereto from the hand controls 30 and 32 through track controller 26 and the two wire loops beneath the track. As shall subsequently be seen, this is accomplished by changing the frequency of the current in the two track loops, in the preferred embodiment stepping the frequency between 22.75 and 45.5 Khz in a manner so as to communicate the desired information in a non-ambiguous manner to the cars.

Figure 12:
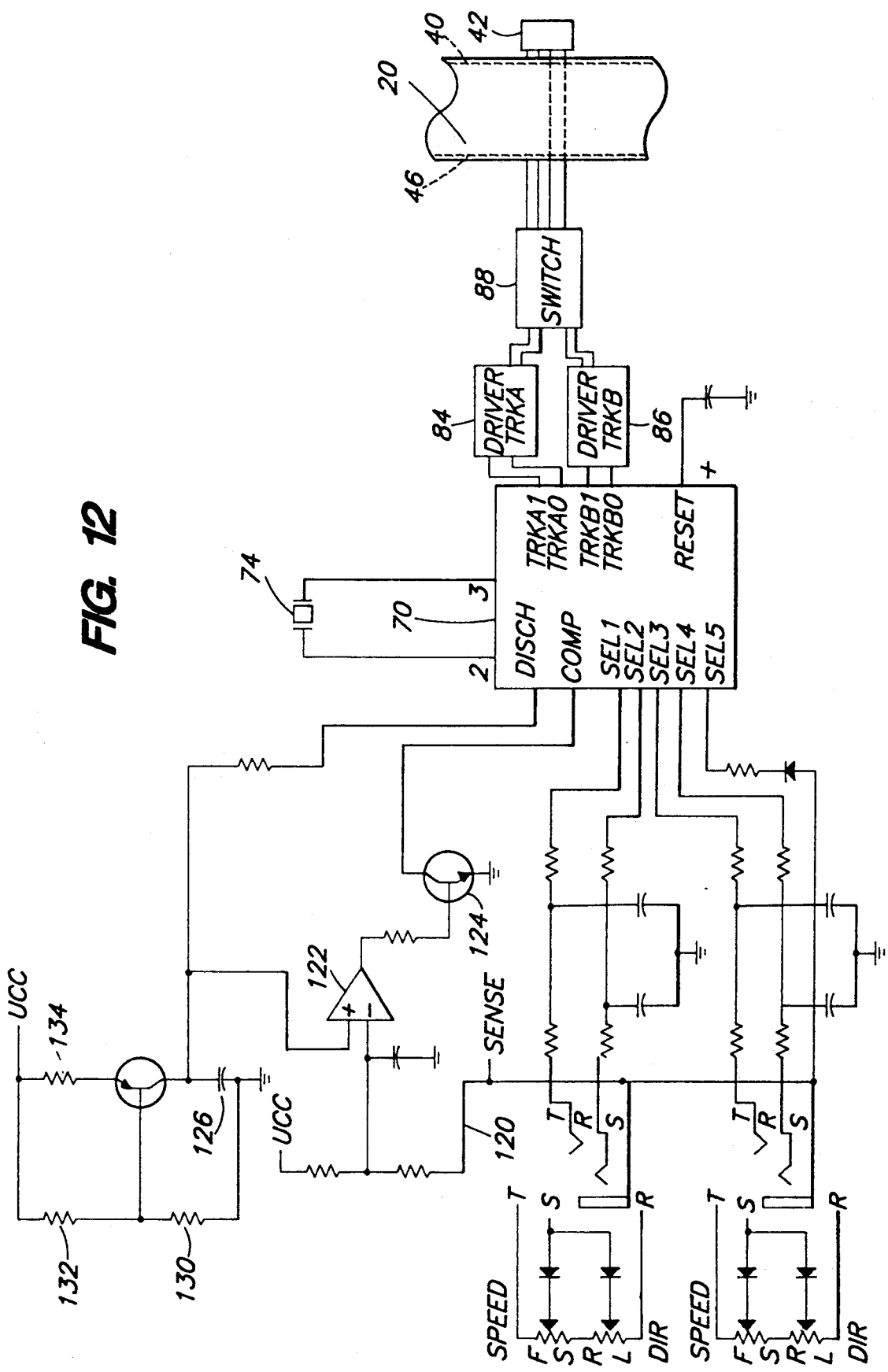
FIG. 12 is a circuit diagram for the main track controller of the preferred embodiment.
Figure 13:
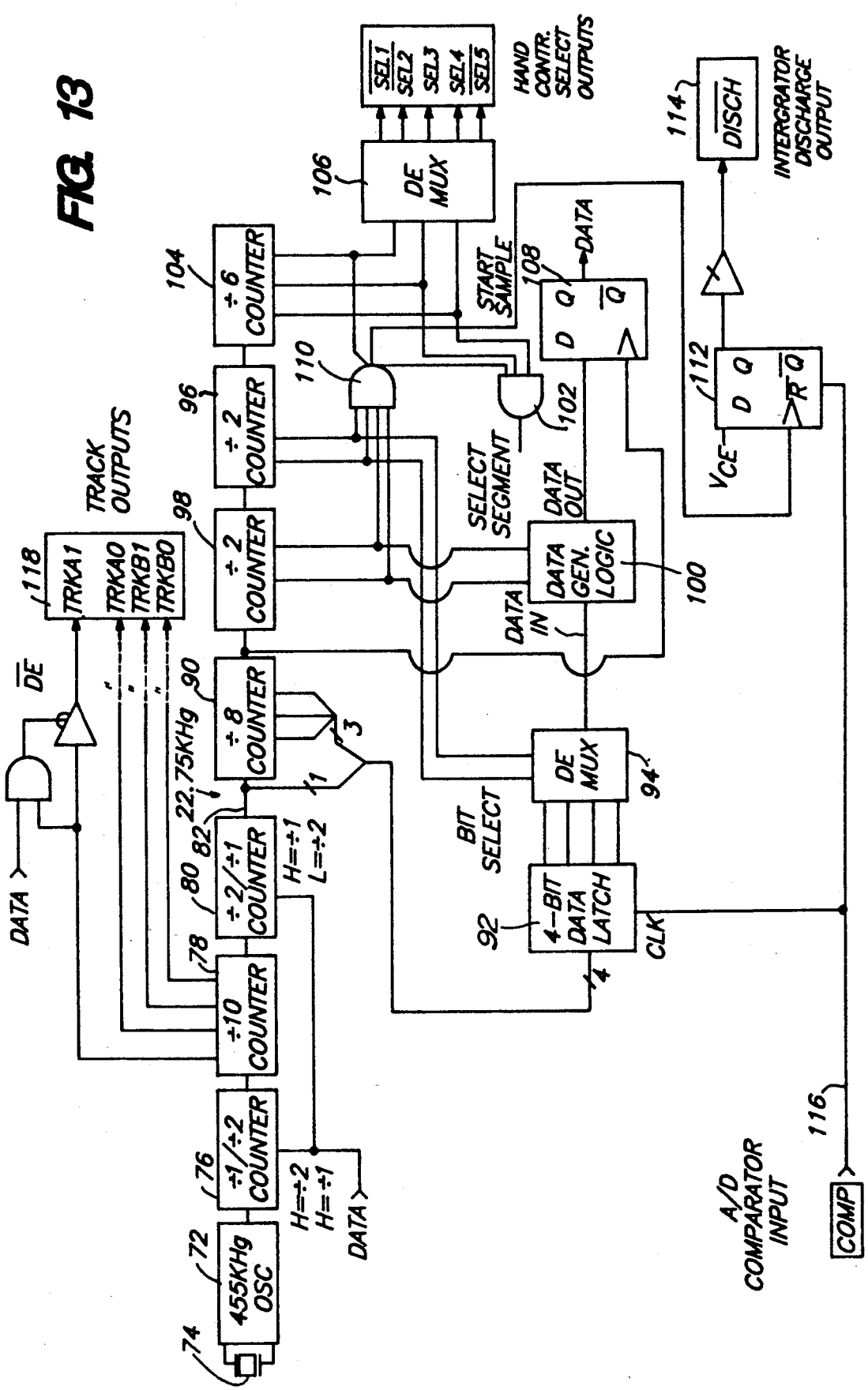
FIG. 13 is a block diagram of the circuit 70 of FIG. 12.
Figure 14:
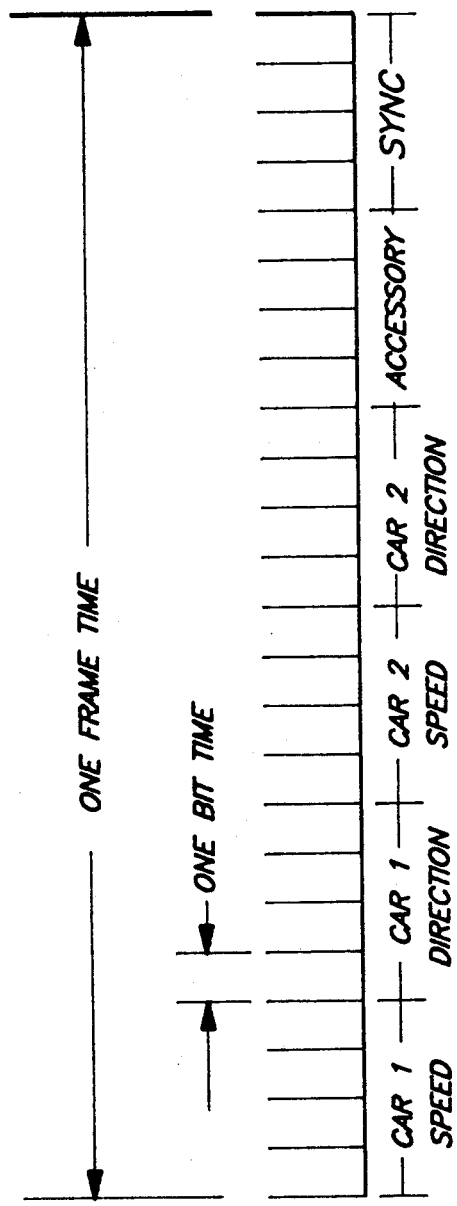
FIG. 14 illustrate a typical communication frame of the preferred embodiment.
Figure 16:
FIGS. 15 and 16 illustrate the frequency step sequences used for communication with the car.
Figure 15:
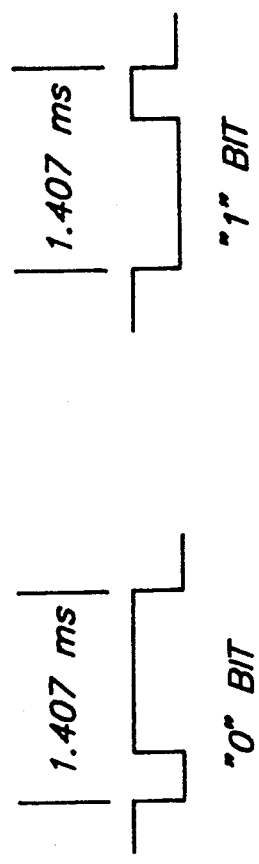

Now referring to FIGS. 12 and 13, details of the track controller 26 of FIG. 1 may be seen. FIG. 12 is a circuit diagram, partially in schematic form, for the track controller, with FIG. 13 providing a block diagram for the circuit 70 of FIG. 12. As stated before, the track controller drives the track loops 40 and 46 with current half sine waves which step between 22.75 Khz and 45.5 Khz in a manner so as to communicate to each respective car its respective steering and throttle control information. The format of this signalling may be seen in FIGS. 14, 15, and 16. The information is communicated through the track wires in frames, each frame having six channels with each channel having four bits of information as may be seen in FIG. 14. In particular, the first four bits carry information regarding the throttle control or speed control for car 1, the second four bits the direction control for car 1, the third four bits the speed control for car 2, the fourth four bits the direction control for car 2, the fifth four bits being reserved for future use, and the sixth four bits, or more appropriately four bit times, being reserved for a sync signal. The formats for a zero bit and a one bit may be seen in FIGS. 15 and 16 respectively. For a zero bit, the first one-fourth of the bit time has a current frequency of 45.5 Khz and the last three-fourths, a frequency of 22.75 Khz. A one bit, on the other hand, continues the initial 45.5 Khz frequency for three-fourths of the bit time with the last one-fourth of the bit time having a frequency of 22.75 Khz. For the four bit times of the sync signal, a constant frequency of 22.75 Khz is used to distinguish the sync signal from information bits. Any changes between the two signal frequencies are made upon the completion of a complete cycle of the prior frequency.

As may be seen in FIGS. 12 and 13, the circuit 70 contains a 455 Khz oscillator 72 referenced to a corresponding crystal 74. The oscillator 72 drives a controllable counter 76 which drives a divide-by-ten counter 78 which in turn drives another controllable counter 80. Counters 76 and 80 either divide by one or divide by two, counter 76 dividing by one when counter 80 divides by two and vice versa so that the output of counter 82 is always a 22.75 Khz signal. The input to counter 80, however, will vary between 22.75 Khz and 45.5 Khz depending upon the data controlling counters 76 and 80, the four outputs of the divide-by-ten counter 78 (conditioned as subsequently described) providing the signals for the track outputs 118 providing the four track outputs TRKA1, TRKA0, TRKB1 and TRKB0. These four signals are grouped in two groups of two, one for track A and one of track B. The two bits or two signals for each track or loop current control provide four combinations of such signals which provide the off plus three levels of current, synthesizing the respective current half sine waves which, after some filtering, provide the drive for loops 40 and 46 under the track (in a manner to be further described). In that regard, switch 88 is provided between the drivers 84 and 86 and the loops under the track so as to controllably reverse the currents in the loops and swap the same between the two loops so that the race cars may race in the opposite direction while still maintaining the communication capability, stability in the steering servos, etc. The output of counter 80 on line 82 is provided to a divide-by-eight counter, with the three bit output of the counter plus the signal on line 82 being provided to a four bit data latch 92. The output of the data latch is coupled to demultiplexer 94 controlled by the output of the two bit counter 96, which in turn is driven by the output of a two-bit counter 98 driven by the output of the eight bit counter 90. The output of the demultiplexer 94 is provided to a data generator logic circuit 100 controlled by the two bit output of the two bit counter 98 and gate 102 controlled by the output of a divide by six counter 104. The output of a divide-by-six counter 104 drives a demultiplexer 106 providing five hand controller select outputs SEL1 through SEL5. The output of the data generator logic 100 is provided to a D-type flip flop 108 clocked by the output of the divide-by-eight counter 90 to provide the data signal from the output of the D flip flop 108. In addition, as may be seen in FIG. 13, the outputs of counters 96 and 98 are gated by gate 110 to clock the flip flop 112 to provide an integrator discharge output 114 that is controlled by the output 116 of a comparator.

The operation of the circuits of FIG. 12 and 13 is as follows: The time required for a full count of counter 104 corresponds to the frame time (see FIG. 14) with each count corresponding to one of the four bit data signals (car 1 speed, car 1 direction, etc.) plus sync. The demultiplexer 106 decodes the signals of each count so as to sequentially read each of the two potentiometers in each of the two hand controllers, and accessory if used. The sixth count is decoded by gate 102 to provide a signal to the data generator logic 100 indicative of the time period for the sync signal. The selected potentiometer during any four bit data signal period is coupled to the sense line 120 (see FIG. 12) which sets the inverting input to comparator 122, the output of which is coupled to the comparator input line 116 (see FIG. 13) of circuit 70 through transistor 124. At the beginning of each hand controller potentiometer select time, capacitor 126 forming a part of an integrator circuit comprising transistors 128 and resistors 130, 132 and 134 begins to charge. At the same time, the four bit count provided as the input to the four bit data latch 92 starts to count upward, with the count being latched into the latch 92 when the comparator 122 is tripped, the time being a measure of the respective potentiometer setting. Thus the four bit signal latched into latch 92 is a four bit digital signal corresponding to the respective potentiometer setting. This signal is sequentially clocked by counter 96 as a serial data input signal to the data generator logic through demultiplexer 94. Counter 98, on the other hand, essentially counts out four 1/4 time segments of each bit. The data output signal of the data generator logic 100 as clocked out by the input to counter 98 through the D flip flop 108 comprises a digital data signal which in a low state will command a 45.5 Khz track line drive, and in a high state will command a 22.75 Khz track line current drive. On the other hand, at the time of a full count on counter 104, gate 102 will detect such full count and commands the data generator logic 100 to output a steady high state data signal to command the 22.75 Khz synch signal throughout the synch signal time period. Similarly, a full count on counters 96 and 98 is detected by gate 110 which clocks the flip flop 112 to enable the beginning of another potentiometer value sense cycle by releasing the discharge line to the integrator (see FIG. 12), the integrator being discharged by the comparator output at the time the four bit data latch 92 was clocked thereby.

It should be noted that the data signal output of the flip flop 108 is also coupled as one input to a circuit coupled to the track outputs 118. Whenever the respective output of the divide-by-ten counter 78 is low, the respective track outputs 118 are enabled and held low. If the respective output of the counter is high, then if the data signal is low, the respective track outputs are held high. If the data signal is high when the respective counter line is high, then the track outputs 118 are disabled, with resistor pull-ups in the track drivers 84 and 86 providing a third level intermediate to the high and low levels of the input to the track controller. In essence, because of filtering differences, etc., the high/low states are used for the 45.5 Khz drive, with the low/pull-up resistor states used for the 22.75 Khz drive so that the drive currents in the wire loops for the two frequencies will be approximately equal. In that regard, it should be noted that the outputs of the divide-by-ten counter 78 are in essence two pairs of digital signals, each pair in essence counting up from zero to three and back down to zero on the respective half cycle of the current frequency, so that when the signals of the two lines for each respective track are appropriately mixed, the resultant simulates or approximates a sine wave. Obviously, therefore, the signal on one pair of lines is counting up and back down while the signals on the other two lines are held inactive or at the low count, and vice versa.

Figure 17:
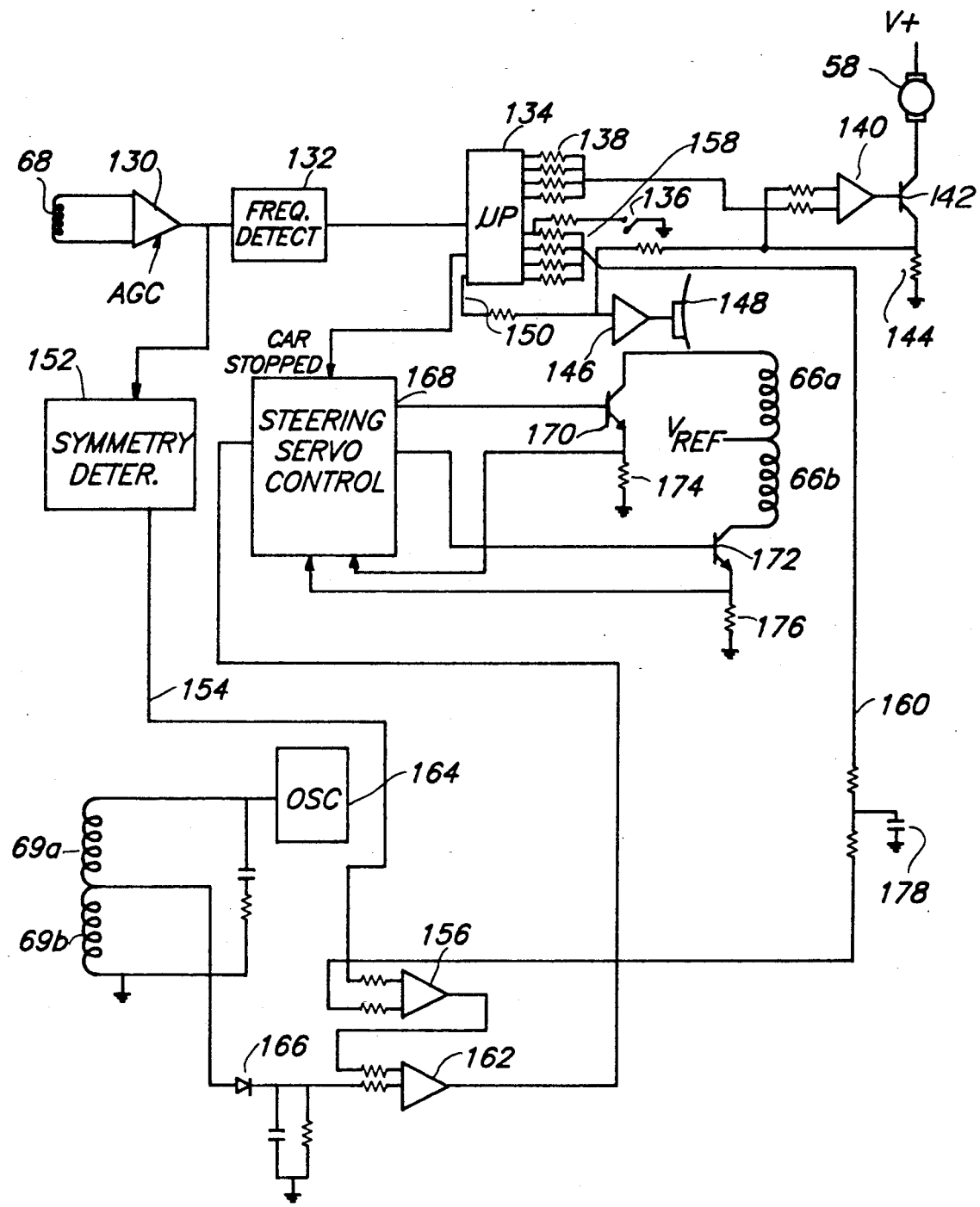
FIG. 17 is a block diagram of the electronics on the car.

Now referring to FIG. 17, a schematic block diagram of the electronics in each car may be seen. The output of the sensing coil 68 is amplified by an amplifier system 130 having an automatic gain control thereon to make up for variations in track position, etc. The output of the amplifier system 130 is then coupled to frequency detection circuit 132 which detects the frequency of each cycle of the sensing coil signal and provides a digital (two level) signal to microprocessor 134 responsive thereto. The form of the serial data is basically that described with respect to FIGS. 14, 15 and 16, the frequency detection circuit 132 in essence merely converting frequency to DC level for the microprocessor input. The microprocessor senses the state of the car select switch 136, a manually controllable switch on the car, and decodes the data stream for the respective car's speed and direction (see FIG. 14) based on the setting of the switch, and of course the relative position of the sync signal with time. The car select switch, of course, allows any two cars to race against each other merely by having the car select switches thereon in opposite switch positions. Four outputs of the microprocessor are provided through a resistor network 138 to an amplifier 140 driving transistor 142 to power motor 58 (see FIG. 3) at any of 16 levels, one of which is the off condition.

A motor current sensing resistor 144 is used to provide a positive feedback to amplifier 140 to reduce the tendency of the car to automatically slow down in the turns. In addition, the voltage across the motor current sense resistor 144 is coupled through an amplifier 146 to a speaker 148 to generate an audible noise dependent on speed and acceleration not unlike an actual race car. Also coupled through line 150 from the microprocessor 134 is a digitally generated engine idle sound signal to generate an engine idle sound through speaker 148 when the motor drive is off, the engine idle sound signal generation being delayed in time by the microprocessor so as to not start until the car normally has reached or is approaching a stop.

The output of amplifier 130 is also coupled to a symmetry detection circuit 152 which provides a signal on line 154 dependent upon the symmetry or lack of symmetry in the output of the sensing coil 68 (see FIGS. 8 and 9) and upon the polarity or direction of any such lack of symmetry. The signal on line 154 therefore is a measure of the present track position of the car (specifically the sensing coil thereon). This signal is provided as one input to amplifier 156, the other input thereto being provided by resistor network 158 converting the four bit steering signal output of the microprocessor 134 corresponding to the steering potentiometer setting in the respective hand unit 30 or 32 (See FIG. 1) to a sixteen level steering control signal on line 160. The output of amplifier 156, provided as an input to amplifier 162, is therefore a signal proportional to the difference between the commanded track position from the respective hand controller and the actual track position as detected by the symmetry detector circuit 152. The other input to amplifier 162 is derived from a tank circuit comprising the sense coils 69a and 69b sensing the present steering position of the front wheels of the car, as driven by an oscillator 164. This signal, rectified by diode 166, in essence provides feedback of the steering position, with the output of amplifier 162 being coupled to a steering servo control circuit 168 which provides power to the steering coils 66a and 66b through transistors 170 and 172, resistors 174 and 176 providing steering coil current feedback signals to the steering servo control. The two steering coils 66a and 66b work in opposition to each other, with both coils having a quiescent current therein at the center point. To steer left, the current in one coil is increased and the current in the other decreased, going substantially to zero at higher commanded steering rates. In general, the steering servo has a relatively high frequency response so that without any changes in the hand controller, the car will sense when it is entering a turn by sensing the changing track position and control the front wheels accordingly without excessive deviation from its commanded track position. On the other hand, the rate of change of track position which may be commanded to the car is purposely limited, avoiding track position change rates which in themselves may cause the car to slide out of control, to overshoot the commanded position, etc.

When the car is stopped, a car stop signal is provided by the microprocessor 134 to the steering servo control 168, essentially turning off the same to conserve battery power. Also, to stop a car in the event it comes off the track, the microprocessor is programmed to stop the car and shut off the servos if it receives a given plurality of successive bad frames of control information, and to not turn on again until a successive plurality of good frames (data plus sync) is diluted. At other times a previous good frame is retained if one or more bad frames is received until either a subsequent good frame is received or a sufficient number of bad frames are received for car shut off.

Figure 18:
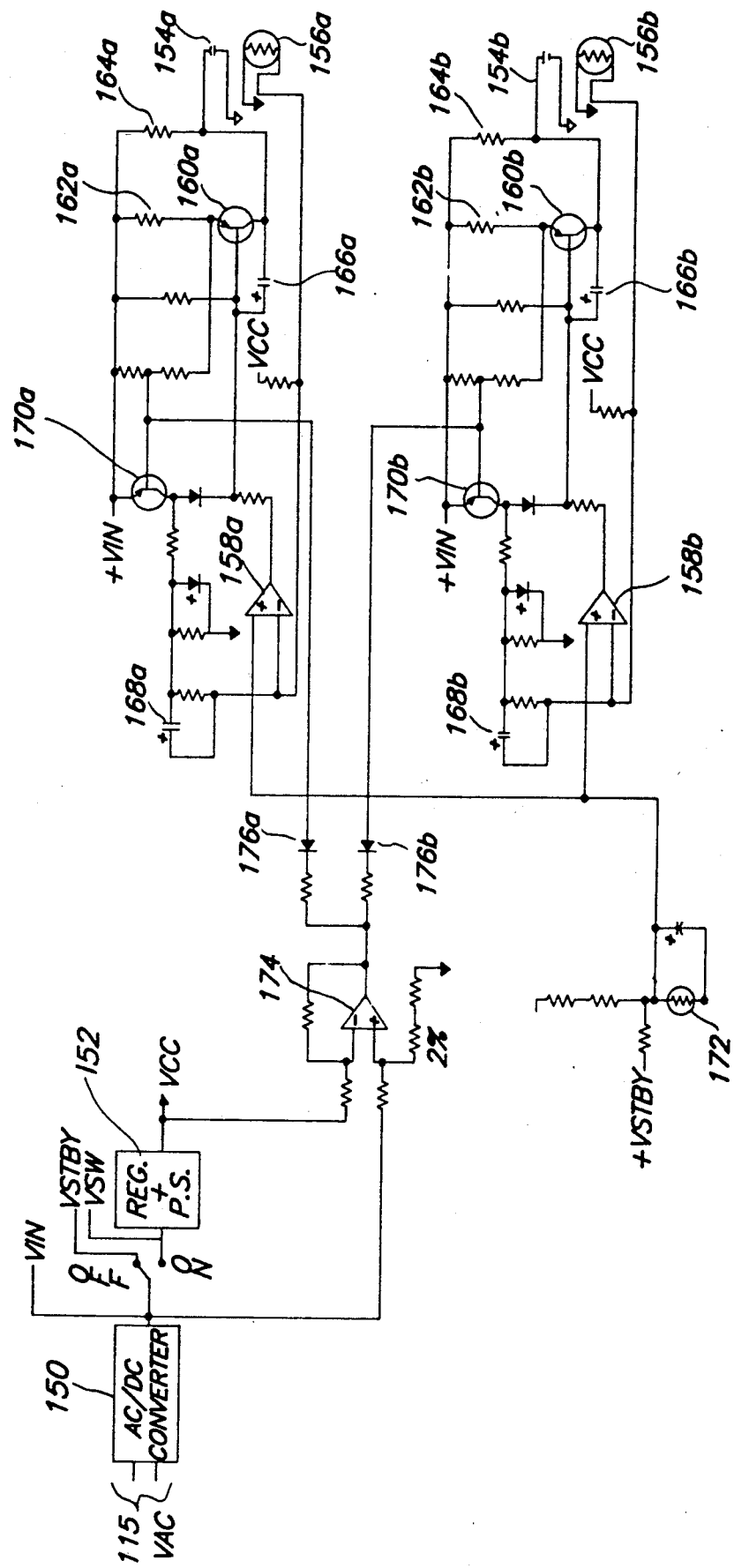
FIG. 18 is a circuit diagram for the power supply and battery charger used for the preferred embodiment of the invention.

Now referring to FIG. 18, a diagram for the power supply and battery charger for the system may be seen. In the preferred embodiment an AC/DC convertor 150 is used to convert the 115 volt AC house power to a 9 volt unregulated DC voltage, the AC/DC convertor preferably being a conventional converter of the type integral with the male plug itself and having a low voltage output power cord extending therefrom, as frequently used for taperecorders and the like. The unregulated output of the converter 150 is applied to a regulator 152 through an on/off switch, the regulator providing a regulated voltage VCC for powering the track controllers and battery charger. In that regard, the battery in each car is a removable battery, and in a typical application a second battery is provided for each car, one battery being charged while the other battery is being used, so that substantially continuous racing may be achieved with an occasional pit stop for battery changes. In the preferred embodiment, the circuitry in the car monitors the battery voltage, cutting the commanded speed of the car approximately in half for a period before the battery runs down to signal to the racer that a pit stop is due, and cutting off power completely if a pit stop is not timely made. In the Figure the batteries being charged are shown as batteries 154a and 154b. Located physically close to the batteries in the charger are associated thermistors 156a and 156b, the thermistors each being responsive to the temperature of one of the batteries. In that regard, a relatively high charging rate is used to charge a battery, so that the batteries will be recharged before those currently being used for race purposes themselves require recharging. When so charged, nicad batteries tend to cool slightly during charging, though when reaching the charged state, will rise in temperature. The increase in temperature of each of the batteries will be sensed by the respective thermistor 156a and 156b to drive the output of comparators 158a or 158b high to turn off transistors 160a or 160b as appropriate to reduce the charging rate of the batteries from a high rate through resistors 162a and 162b to a trickle charge through resistors 164a and 164b.

To maintain accuracy in this operation over changes in ambient (room) temperature, a reference to the comparators 158a and 158b is provided by thermistor 166 and associated circuitry coupled to the noninverting input of the comparators so that thermistors 156a and 156b will track thermistor 172 as to ambient temperature changes, allowing the battery thermistors to be responsive to the increase in battery temperature with respect to that ambient. Also, histeresis is provided in the circuitry shown so that once a charge rate trips from the high charge rate to the trickle charge rate, the same will not return to the high charge rate when the associated battery thermistor cools off. On the otherhand, upon removal of a charged battery and replacement of the same by a battery which is substantially depleted, the respective one of capacitors 166a and 166b pulses the circuits back on, capacitors 168a and 168b providing a substantial delay in the circuit's subsequent response to the temperature of the respective battery temperature sensing thermistor 156a or 156b. Thus, when a battery is fully charged the respective charging circuit will switch to a standby or trickle charge mode, not returning to the high charge rate mode when the respective battery temperature sensing thermistor returns to ambient temperature. On the otherhand, upon removal of a charged battery and insertion of a battery needing charging, the respective one of capacitors 166a and 166b will pulse the circuit back on to charge the battery through the respective ones of transistors 160a and 160b, even if the same had just been turned off and the respective battery temperature sensing thermistor is still substantially elevated from ambient temperature, with the respective one of capacitors 168a and 168b and associated circuitry maintaining the circuit on for a sufficient period for the respective battery temperature sensing thermistor to cool down to keep the circuit on until such time as the most recently inserted battery has been charged (or removed).

As may be seen in FIG. 18, the bases of transistors 170a and 170b are controlled by the output of amplifier 174, at least if the output of the amplifier is low. The inputs to the differential amplifier 174 are the unregulated output of the AC/DC convertor 150 and the regulated output of the regulator 152. Whenever VIN is sufficiently high compared to VCC, the output of amplifier 174 will be high, decoupling the output from the bases of transistors 170a and 170b by way of diodes 176a and 176b. However, in the event VIN decreases so as to approach a level wherein regulator 152 can no longer hold the regulated output VCC, the output of amplifier 174, connected so as to have a relatively high gain, will start to drop, tending to turn on transistors 170a and 170b, pulling the base of transistors 160a and 160b supplying charging current to the batteries upward to decrease the current therethrough so that VIN will not further slide to interfere with the operation of regulator 152 and its ability to hold the regulated output voltage VCC. This prevents the battery charger from pulling down the output of the AC/DC convertor 150 to such an extent as would prevent continued racing during the recharging of the second set of batteries, as might occur in low voltage house power situations, when an AC/DC convertor of lower capacity than desired is used, etc.

In the embodiment heretofor described, the two conductors under the track, each a single turn of wire, when conducting carry a substantial fraction of one ampere of current to provide the desired field strength for sensing by the sensing coil on the car. To provide this current it is important that the contact resistance of the various high current contacts are held to a minimum. For this purpose redundancy is provided in various power supply contacts, etc. to minimize this problem. If desired, however, each conductor may be comprised of multiple turns to provide the same field strengths for sensing on much lower currents, or alternatively higher field strengths if desired. This was not done with a preferred embodiment in the present invention, however, because of lack of necessity for doing so and the inconvenience of providing multiple turns in a toy race car set assembly of this general type, though if the present invention navigation system is used in other applications, such as by way of example, commercial applications involving the automatic control of vehicles, fork lift trucks and the like, multiple turn conductors may be desirable. In addition, if desired, the effect of multiple turn conductors may be achieved by connecting a plurality of cable segments together, each cable segment having a plurality of conductors therein so that upon closing the loop the conductors are connected in series to provide the effect of a multiple turn conductor.

Also in the preferred embodiment described herein, each of the two conductors is conducting on alternate half cycles of a sine wave of a given frequency, essentially operating in a time shared fashion. Obviously instead of half cycles, full cycles or mutliple cycles might be used on one conductor, then full cycles or multiple cycles on the other conductor, etc., though the preferred embodiment method of alternating half cycles provides a high frequency response on the vehicle to track position for a given conductor operating frequency, and makes both communication and decoding on the car relatively simple. The high frequency response is important in certain applications, such as by way of example the race car set described herein, as the high frequency response is required both for quick response of the car steering system when a race car enters and exits a turn, and for stability of the car in the straight-a-ways.

Instead of time sharing in this manner one could also use frequency separation, only driving one conductor with current of one frequency (or within one frequency range, using frequency changes within that range for communication with the car) and another frequency or frequency range for the other conductor. Such an arrangement is believed more complicated than the preferred embodiment disclosed herein, though will still operate well with a single sensing coil on the vehicle, or two sensing coils on the vehicle, one for each frequency range as desired. In these as well as other embodiments of the invention, much greater lateral movement of the car may readily be provided in comparison to single conductor system, as the two conductor system allows location of the car and control of the car relative to the position of the two spaced apart conductors, whereas the single conductor system performs well only over a much narrower range of relative lateral movement between the car and the single conductor.

While the preferred embodiment has been disclosed and described herein with respect to a toy race car set, the same is also useful for vehicles, including full scale vehicles of other kinds, such as fork lift trucks and other types of vehicles as hereinbefore mentioned. The advantage of the present invention, of course, is that the increased lateral range will allow passing of vehicles, etc. without requiring special hardwired turnout lanes switching, etc. In addition, two dimensional control systems as well as possibly three dimensional control systems, based on the principles of the present invention may also be constructed by appropriate separation of the signals from a plurality of sensing coils on the vehicle for proper interpretation of the signals received. Thus while the present invention has been disclosed and described with respect to certain preferred embodiments thereof, it will be understood by those skilled in the art that various changes in form and detail may be made therein without departing from the spirit and scope of the invention.

We claim:

1. A method of controlling a vehicle comprising the steps of:

(a) providing a varying current in each of two spaced apart conductors disposed along an approximate path of travel desired for the vehicle;

(b) sensing by a single sensing coil on the vehicle to be controlled, a varying magnetic field caused by the varying current in each of the two spaced apart conductors;

(c) steering the vehicle responsive to a difference between a first amplitude and a second amplitude of the varying magnetic field as sensed by the sensing coil, the first amplitude of the varying magnetic field caused by the varying current in one of the two spaced apart conductors and the second amplitude of the varying magnetic field caused by the varying current in the other of the two spaced apart conductors.

2. A method of controlling a vehicle comprising the steps of:

(a) providing a varying current in each of two spaced apart conductors disposed along an approximate path of travel desired for the vehicle, wherein the current in the two spaced apart conductors alternates between a first state wherein the current in a first of the two spaced apart conductors is varied as the current in a second of the two spaced apart conductors is kept substantially constant, and a second state wherein the current in the second of the two spaced apart conductors is varied as the current in the first of the two spaced apart conductors is kept substantially constant;

(b) sensing by at least one sensing coil on the vehicle to be controlled, a varying magnetic field caused by the varying current in each of the two spaced apart conductors;

(c) steering the vehicle responsive to an amplitude of the varying magnetic field caused by the varying current in one of the two spaced apart conductors relative to an amplitude of the varying magnetic field caused by the varying current in the other of the two spaced apart conductors as sensed by the sensing coil.

3. The method of claim 1 wherein the current in the two spaced apart conductors alternates between a first state wherein the current in a first of the two spaced apart conductors is varied as the current in a second of the two spaced apart conductors is kept substantially at zero, and a second state wherein the current in the second of the two spaced apart conductors is varied as the current in the first of the two spaced apart conductors is kept substantially at zero.

4. The method of claim 3 wherein in the first state, the current in the first of the two spaced apart conductors is controlled to approximately represent one half cycle of a current sine wave, and in the second state, the current in the second of the two spaced apart conductors is controlled to approximately represent the other half cycle of the same current sine wave.

5. The method of claim 4 wherein each part of the current sine wave is digitally synthesized.

6. The method of claim 4 wherein in step (c), the vehicle is steered by controlling the vehicle steering responsive to the amplitude of the varying magnetic field caused by the varying current in one of the two spaced apart conductors relative to the amplitude of the varying magnetic field caused by the varying current in the other of the two spaced apart conductors, as sensed by the at least one sensing coil, and a separately controlled steering signal, whereby the path of travel of the vehicle relative to the two spaced apart conductors may be controlled by the separately controlled steering signal.

7. The method of claim 6 wherein the separately controlled steering signal is generated off the vehicle and coupled to the vehicle by varying the period of the current sine wave and sensing the same by the at least one sensing coil.

8. The method of claim 1 wherein the two spaced apart conductors are disposed in a plane substantially parallel to a surface on which the vehicle is to travel, and wherein said at least one sensing coil on the vehicle is a sensing coil oriented with its axis substantially perpendicular to the surface on which the vehicle is to travel.

9. The method of claim 1 wherein in step (c), the vehicle is steered further in response to a separately controlled steering signal, to move the vehicle between the conductors.

10. The method of claim 1 wherein in step (c), the vehicle is steered by controlling the vehicle steering responsive to the amplitude of the varying magnetic field caused by the varying current in one of the two spaced apart conductors relative to the amplitude of the varying magnetic field caused by the varying current in the other of the two spaced apart conductors, as sensed by the at least one sensing coil, and a separately controlled steering signal, whereby the path of travel of the vehicle relative to the two spaced apart conductors may be controlled by the separately controlled steering signal.

11. The method of claim 10 wherein the separately controlled steering signal is generated off the vehicle and coupled to the vehicle by varying the period of the current sine wave and sensing the same by the at least one sensing coil.

12. The method of claim 11 wherein an additional separately controlled signal is generated off the vehicle and coupled to the vehicle by varying the period of the current sine wave and sensing the same by the at least one sensing coil.

13. The method of claim 12 wherein the separately controlled steering signal and the additional separately controlled signal are coupled to the vehicle in digital form by varying the period of the current sine wave between two values and sensing the same by the at least one sensing coil.

14. The method of claim 12 or 13 wherein the additional separately controlled signal is a vehicle speed control signal.

15. The method of claim 10 wherein the separately controlled steering signal is generated off the vehicle and coupled to the vehicle in digital form by varying the period of the current sine wave between two values and sensing the same by the at least one sensing coil.

16. A method of controlling a vehicle comprising the steps of:

(a) providing a varying current in each of two spaced apart conductors disposed along an approximate path of travel desired for the vehicle, the current in the two spaced apart conductors alternating between a first state wherein the current in the first of the two spaced apart conductors is controlled to approximately represent one half cycle of a current sine wave as the current in a second of the two spaced apart conductors is kept substantially constant, and a second state wherein the current in the second of the two spaced apart conductors is controlled to approximately represent the other half cycle of the same current sine waves as the current in the first of the two spaced apart conductors is kept substantially constant;

(b) varying the period of the current sine wave responsive to a separately controlled steering signal;

(c) sensing by at least one sensing coil on the vehicle to be controlled, a varying magnetic field caused by the varying current in each of the two spaced apart conductors;

(d) steering the vehicle responsive to an amplitude of the varying magnetic field caused by the varying current in one of the two spaced apart conductors relative to a n amplitude of the varying magnetic field caused by the varying current in the other of the two spaced apart conductors and the varying period of the current sine wave as sensed by the at least one sensing coil;

whereby the path of travel of the vehicle relative to the two spaced apart conductors may be controlled by the separately controlled steering signal.

17. The method of claim 16 wherein each part of the current sine wave is digitally synthesized.

18. The method of claim 16 wherein the two spaced apart conductors are disposed in a plane substantially parallel to a surface on which the vehicle is to travel, and wherein said at least one sensing coil on the vehicle is a sensing coil oriented with its axis substantially perpendicular to the surface on which the vehicle is to travel.

19. The method of claim 16 wherein an additional separately controlled signal is generated off the vehicle and also coupled to the vehicle by varying the period of the current sine wave and sensing the same by the at least one sensing coil.

20. The method of claim 19 wherein the separately controlled steering signal and the additional separately controlled signal are coupled to the vehicle in digital form by varying the period of the current sine wave between two values and sensing the same by the at least one sensing coil.

21. The method of claim 19 or 20 wherein the additional separately controlled signal is a vehicle speed control signal.

* * * * *